Patented Jan. 30, 1923.

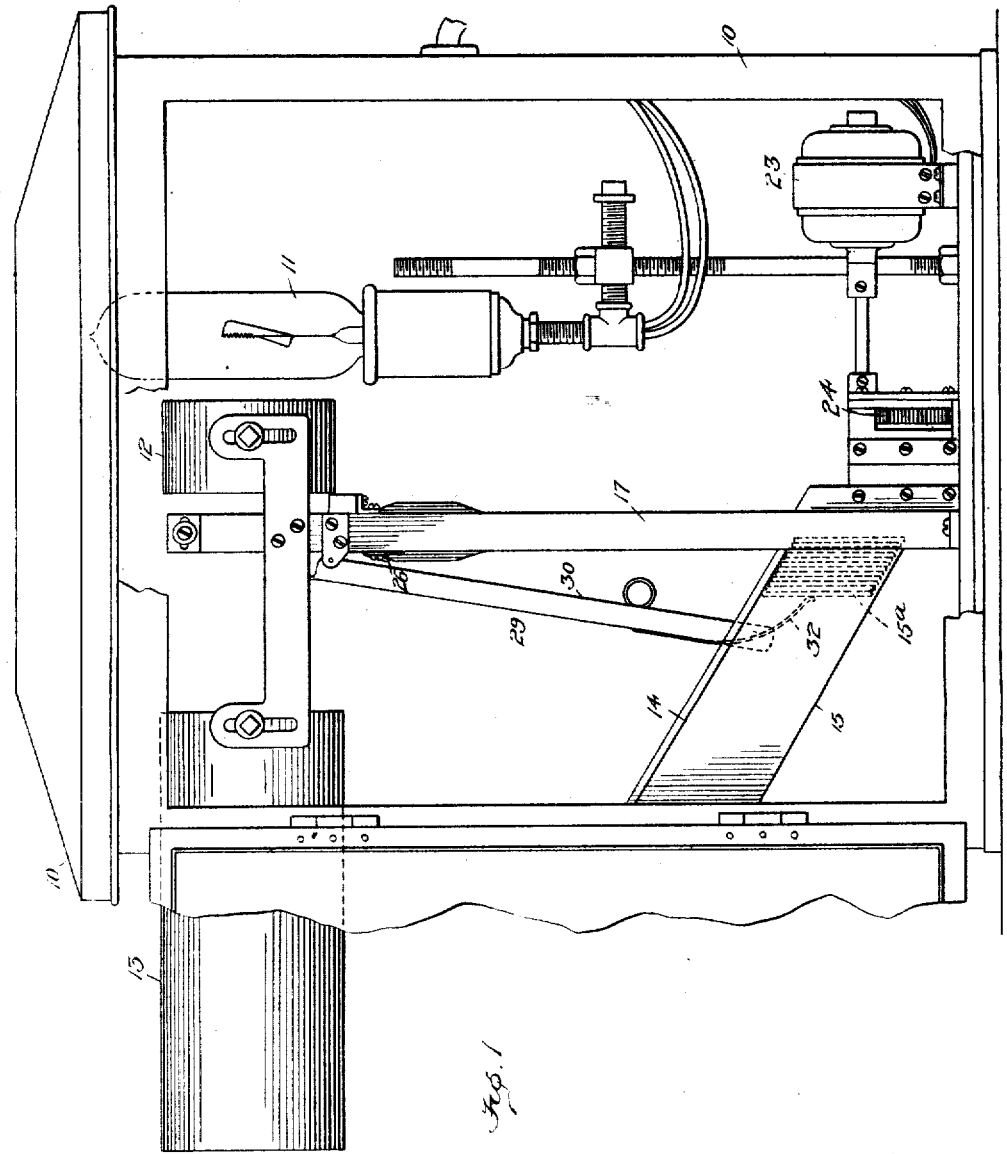

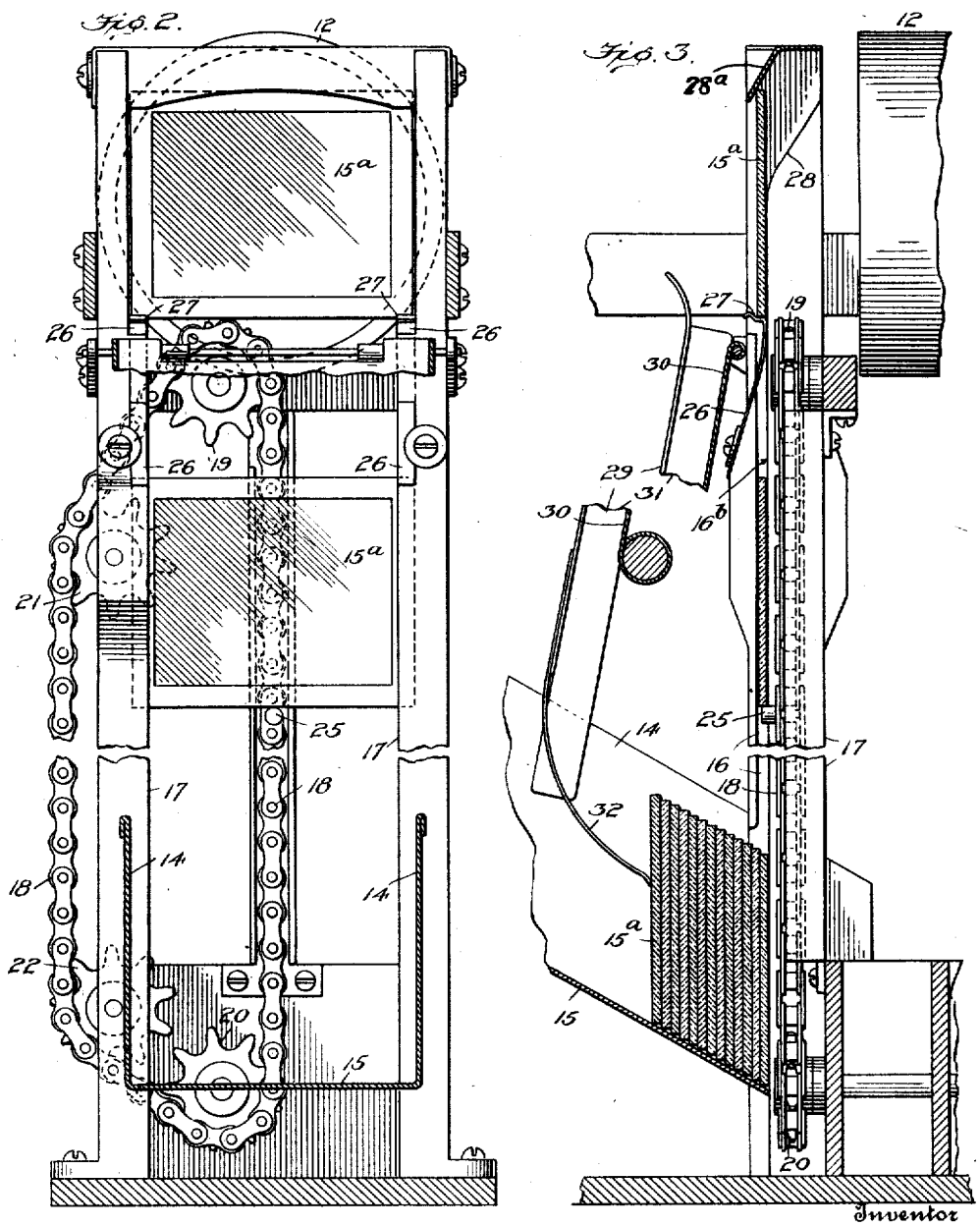

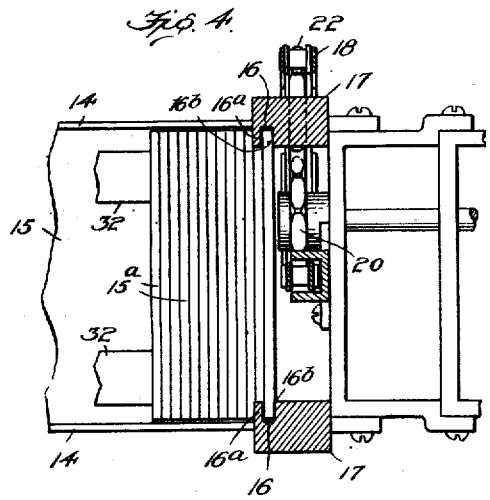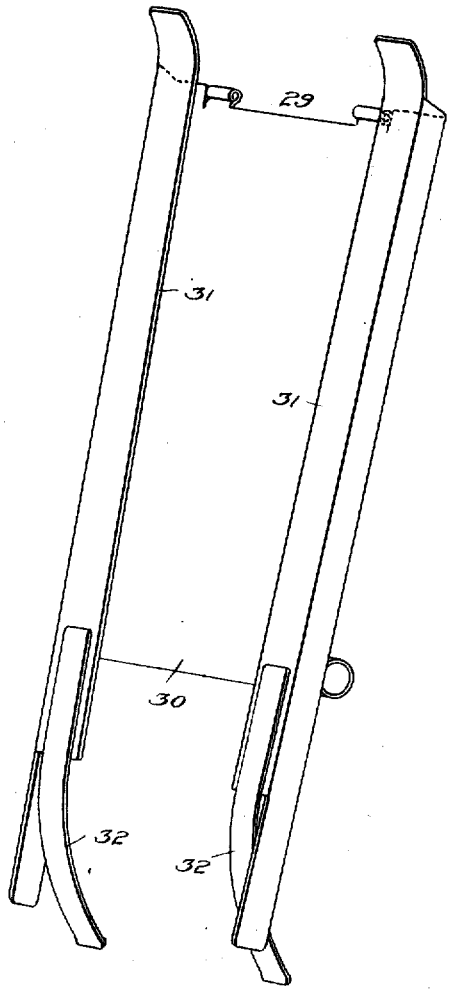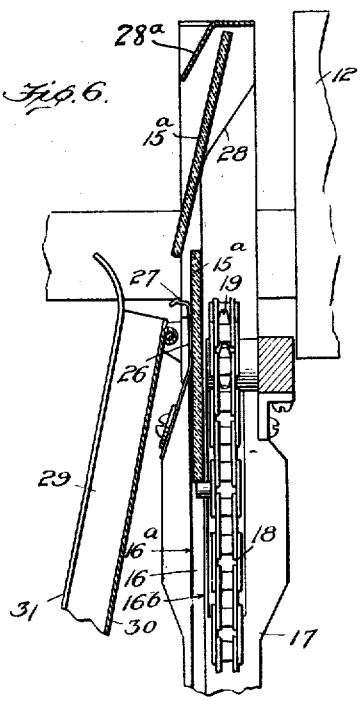

1,443,711

UNITED STATES PATENT OFFICE.

BEN W. LAUCHLY, OF JACKSON, MISSISSIPPI.

AUTOMATIC PICTURE-SLIDE DISPLAY APPARATUS.

Application filed January 6, 1922. Serial No. 527,342.

*To all whom it may concern:*

Be it known that I, BEN W. LAUCHLY, a citizen of the United States, residing at Jackson, in the county of Hinds and State of Mississippi, have invented certain new and useful Improvements in Automatic Picture-Slide Display Apparatus; and I do hereby declare the following to be a full, clear, and exact description of the same, reference being had to the accompanying drawings, forming a part of this specification.

This invention relates to automatic display apparatus adapted to successively display each of a series of picture slides. In accordance with usual practice in the art, the series of slides is located in a slide magazine and each slide is carried, successively, by suitable mechanism from said magazine to a point of display. After having been displayed the used slide is returned by other devices from the point of display to the magazine from whence it started, the returned slide, however, being replaced at the rear end of the series.

An object of the present invention is to provide an improved mechanism for discharging the used slide from its support at the point of display, the advantages of this portion of the apparatus lying principally in its simplicity and consequent low cost of production.

A further object is to arrange the slide returning device in such wise that any number of slides may be accommodated in the magazine.

A further object is to provide an apparatus in which the slides to be used need not be of any special design, such as being provided with projections on their edges, etc.

With these and other objects in view the invention consists in certain combinations and arrangements of parts, all as will be hereinafter fully described and the novel features thereof particularly pointed out in the appended claims.

In the accompanying drawings—

Figure 1 is a side elevation of the apparatus, the side of the housing being removed to illustrate the interior of the apparatus;

Fig. 2 is a sectional veiw taken transversely of the machine through the lower end of the magazine and looking toward the slide elevating mechanism;

Fig. 3 is a sectional view of the same parts taken at right angles to Fig. 2.

Fig. 4 is a detail view of the return chute, and

Figs. 5 and 6 are detail sectional views illustrating the manner in which a slide is supported at the point of display and in which the said slide is discharged from its support.

The apparatus is enclosed in a housing 10 whose sides are hinged, like doors, to give ready access to the interior of the apparatus. As the present invention resides solely in the mechanism for manipulating the slides, a general description of the various elements for projecting the pictures will suffice. The usual source of light 11 is carried on any desired form of adjustable support within the housing 10 in rear of the lenses 12 and the objective 13 for projecting the pictures is mounted adjacent the front end of said housing.

The slide magazine, comprising side walls 14 and a bottom 15, is preferably located in the front portion of the housing, being supported in any suitable manner from the base of the housing with its bottom 15 inclined rearwardly. The slides 15 are supported in an upright position on the inclined bottom 15, said bottom forming a platform for the slides. As will later appear the slides are fed down the inclined bottom 15, the slide at the lowermost end of said bottom being adapted to register with vertical guide ways 16 in a pair of standards 17 suitably mounted on the base of the housing at each side of the magazine. Each slide 15, when in this position, is adapted to be carried upwardly in the guide ways 16 to a point in front of the lenses 12 where it will be held stationary while the picture thereon is displayed.

As shown in the drawings, this slide elevating mechanism consists of an endless sprocket chain 18 carried on sprocket wheels 19, 20 journaled in cross pieces at the top and bottom, respectively, of the standards 17, and sprocket wheels 21, 22 journaled in one of the standards at the top and bottom, respectively, thereof. Sprockets 19 and 20 are journaled in said cross pieces intermediate the two standards with their peripheries arranged centrally of the standards so that the reach of the sprocket chain 18 between said wheels will lie centrally of the two standards. Sprocket wheel 22 is connected to the shaft of a motor (preferably strapped to the base of the housing) indicated at 23, the driving connections between said motor and sprocket embodying suitable speed reducing gears 24 for reducing the speed of travel of chain 18.

A stud or post 25, of less length than the thickness of the individual slides, is carried on one of the links of the chain 18 on the side of said link adjacent the slides in the magazine and as the sprocket chain is driven around on the sprocket wheels said stud engages the bottom edge of the lowermost slide and carries it upward in the ways 16. Secured on the front wall 16$^a$ of each guide way is a spring 26 extending across said guide ways into contact with the rear walls 16$^b$ of the ways. The upper ends of said springs 26 are bent back and upward, as at 27, towards the front walls 16$^a$ to form a shelf for supporting the raised slide in front of lenses 12 in display position.

A slide carried up by the chain and stud will force springs 26 back from the rear walls of the guide ways and as the stud reaches the height of its travel upward the bottom edge of the slide will have been elevated just above the bent portions 27 of the springs and said springs will snap back against the rear walls 16$^b$ and hold the slide in display position.

While the present device is illustrated as comprising a single stud, it is evident that under various conditions two or more studs may be used, as for instance if it is desired to elevate the slides more frequently or if a comparatively long chain is utilized.

To permit the slide to be returned to the magazine after it has been displayed and another slide is elevated, the front walls 16$^a$ of the guide ways 16 are cut away or terminate a short distance below the bent ends 27 of the springs 26 while the rear walls 16$^b$ of said ways extend upwardly a sufficient distance to aid in properly positioning the slides in front of the lens. Near their upper extremities, at a point just above the middle of the slide on the springs 26, said rear walls 16$^b$ are inclined as at 28.

Assuming a slide to be in display position and that the stud 25 has been carried around and engaged another slide, said on-coming slide will, as it is elevated, pass beneath springs 26 and engage the bottom of the slide on display (called the used slide). The used slide will then also be elevated until its center passes above the inclined ends of walls 16$^b$ when its upper end will be tilted backward and its lower edge moved forward away from the walls 16$^b$. To insure the upper end of the used slide falling or tilting backward a guard 28$^a$ is located above the upper ends of the guideways (see Figs. 3 and 6). The on-coming slide will then pass behind the used slide and as it does the used slide, being no longer supported by the springs 26 or by the on-coming slide, will drop into a return chute 29 and pass down into the magazine at the end of the series in the magazine and will afterwards be gradually fed towards the ways 16 as the apparatus continues to operate.

To provide accommodations for any number of slides in the magazine and to insure the slides being maintained in an upright position on the inclined floor of the magazine, the return chute 29 is made in the form of a frame 30 pivotally mounted at its upper end and provided with downwardly extending return guide ways 31 for the slides. The upper end of said frame is pivoted close to the standards 17, its lower end having a tendency to swing in close to the lower ends of the standards. The lower end of the frame extends down between the side walls of the magazine and as it swings towards the standards it will engage the slides in the magazine and hold them in upright position, the series of slides being supported at their opposite end by the walls of the guideways 16.

Resilient fingers 32, preferably curved towards the standards 17, are provided on the lower end of the frame 30 and have a cushioning effect on the returning slide as it approaches the lower end of the chute.

As will be apparent, the number of slides that may be accommodated between the ways 16 and the end of the swinging frame is limited only by the length of the floor of the magazine. By supporting the slides in the magazine in the manner just described, and by arranging the elevating mechanism so that the stud 25 engages the bottom of the slide while the latter is supported by the ways 16, the slides need not be provided with projections on their edges but, on the other hand, ordinary slides having plane, straight edges are capable of use in the present apparatus.

What is claimed is:

1. In a display apparatus for picture slides, the combination of a slide magazine, mechanism for elevating the slides from the magazine to a point of display, said magazine having means for feeding the slides to the elevating mechanism, and a pivoted return chute for returning the slides from the point of display to the magazine, the delivery end of said chute being adapted to deposit the used slide at any one of a plurality of points in the magazine.

2. In a display apparatus for picture slides, the combination of a slide magazine, mechanism for elevating the slides from the magazine to the point of display, said magazine having means for feeding the slides to the elevating mechanism, and a pivotally mounted return chute for returning the slides from the point of display to the magazine, the delivery end of said chute being movable longitudinally of the magazine whereby a slide may be deposited at any one of a plurality of points throughout the length of the magazine.

3. In a display apparatus for picture slides, the combination of a slide magazine, mechanism for elevating the slides from the magazine to a point of display, said magazine having an inclined bottom adapted to feed the slides to the elevating mechanism, and a pivotally mounted return chute for returning the used slides from the point of display to the magazine, the delivery end of the return chute being adapted to engage the slides in the magazine and maintain them in upright position on the inclined bottom of the magazine.

4. A display apparatus for picture slides comprising a slide magazine, means for supporting a slide at a point of display, means for successively elevating the slides from the magazine to the point of display and slightly elevating the preceding displayed slide above the point of display, means for tilting the displayed slide after it has been slightly elevated, and means for returning the displayed slide to the magazine.

5. A display apparatus for picture slides comprising a slide magazine, guide ways extending from the magazine to a point of display, one wall of each guide way projecting above the point of display and being inclined adjacent its upper end, means for successively elevating the slides from the magazine to the point of display, and means for guiding the upper edge of the on-coming slide into engagement with the lower edge of the used slide to support and slightly elevate the latter and permit the upper end of said used slide to tilt backward on the inclined portions of the guide way walls.

6. A display apparatus for picture slides comprising a slide magazine, guide ways extending from said magazine to a point of display, means for successively elevating the slides from the magazine to a point of display, means for supporting one slide in position for display and guiding the upper edge of the next elevated slide into engagement with the lower edge of the slide on display, whereby the slide on display will be supported and slightly elevated by the on-coming slide, and means for tilting the slide on display.

7. In a display apparatus for picture slides, the combination of a slide magazine, guide ways extending from the magazine to a point of display, means for successively elevating the slides from the magazine to point of display, means for supporting one slide in display position and guiding the next on-coming slide into engagement with the lower end of the supported slide, whereby the supported slide will be supported and slightly elevated by the on-coming slide, means for moving the lower edge of the supported slide away from the walls of the guide ways whereby the on-coming slide will be elevated between the used slide and the walls of the guide ways, and means for returning the used slide to the magazine.

8. In a display apparatus for picture slides, the combination of a slide magazine, guide ways extending from the magazine to a point of display, means for supporting a slide at the display point and guiding the next on-coming slide into engagement with the used slide, whereby the latter will be elevated, a pivotally mounted frame having return guide ways therein for returning a used slide to the magazine, and means for tilting the used slide off its support and depositing it in the return guide ways.

9. In a display apparatus for picture slides, the combination of a slide magazine, guide ways extending from the magazine to a point of display, means for elevating the slides from the magazine to the point of display, means for supporting a slide at the display point and guiding the next on-coming slide into engagement with the used slide, whereby the used slide will be elevated, a swinging frame pivoted at its upper end, guide ways in said frame adapted to return the used slides by gravity to the magazine, means for tilting the used slide as it is elevated by the on-coming slide and depositing it in the return guide ways, and means for cushioning the slide as it falls down the return guide ways.

10. In a display apparatus for picture slides, the combination of a slide magazine having an inclined bottom for supporting the slides, guide ways extending from the magazine to the point of display, means for elevating the slides in said guide ways, means for supporting a slide at the point of display and guiding the next on-coming slide into engagement with the lower edge of the used slide, whereby the latter will be elevated, a swinging frame, guide ways in said frame adapted to return the slides from the point of display to the magazine, means for tilting the used slide as it is elevated by the on-coming slide and depositing it in the return guide ways, and means carried by said frame for maintaining the slides in substantially vertical position on the inclined bottom of the magazine.

11. In a display apparatus for picture slides, the combination of a magazine, guide ways leading from the magazine to a point of display, means for feeding the slides from the magazine to the point of display, and a frame having return guide ways for returning the used slides from the point of display to the magazine, said frame being movable towards and away from the feeding guide ways whereby varying numbers of slides may be accommodated in the magazine.

12. In a display apparatus for picture slides, the combination of a magazine, means for supporting a slide at a point of display, mechanism for successively moving the slides from the magazine to the point of display, means for guiding the on-coming slide into engagement with the used slide, means for tilting the used slide as it is elevated by the on-coming slide, and a movable return chute adapted to receive the tilted slide and return it to the magazine.

13. In a display apparatus for picture slides, the combination of a magazine for the slides, means for supporting a slide at a point of display, mechanism for successively moving the slides from the magazine to the point of display, means for removing the used slide from its support at the point of display, and a movable return chute adapted to receive the used slide as it is discharged from its support at the point of display and return it to the magazine.

14. In a display apparatus for picture slides, the combination of a magazine, means for successively elevating the slides from the magazine to a point of display, said elevating means comprising an endless chain having one of its reaches located between the side edges of the slide to be elevated from the magazine, and means on said chain for engaging the bottom edge of the slide.

BEN W. LAUCHLY.